(12) United States Patent
Miles et al.

(10) Patent No.: US 7,770,674 B2
(45) Date of Patent: Aug. 10, 2010

(54) WHEEL CHAIR

(75) Inventors: David Michael Miles, Edmond, OK (US); Todd Russell Peters, Milford, MI (US)

(73) Assignee: Fallbrook Technologies Inc., San Diego, CA (US)

( * ) Notice: Subject to any disclaimer, the term of this patent is extended or adjusted under 35 U.S.C. 154(b) by 540 days.

(21) Appl. No.: 11/686,303

(22) Filed: Mar. 14, 2007

(65) Prior Publication Data

US 2007/0284844 A1   Dec. 13, 2007

Related U.S. Application Data

(60) Provisional application No. 60/782,046, filed on Mar. 14, 2006.

(51) Int. Cl.
  *F16H 3/72* (2006.01)
(52) U.S. Cl. ............... 180/65.1; 180/907; 477/44
(58) Field of Classification Search .......... 180/65.1, 180/907; 475/5, 149, 150; 477/3, 44–46; 280/47.34; *F16H 3/72*
See application file for complete search history.

(56) References Cited

U.S. PATENT DOCUMENTS

| | | | | |
|---|---|---|---|---|
| 4,642,069 | A * | 2/1987 | Sawada et al. | 474/28 |
| 4,706,518 | A * | 11/1987 | Moroto et al. | 475/210 |
| 4,976,170 | A * | 12/1990 | Hayashi et al. | 477/43 |
| 5,161,630 | A | 11/1992 | Garin, III et al. | |
| 5,253,724 | A * | 10/1993 | Prior | 180/6.5 |
| 5,269,726 | A * | 12/1993 | Swanson et al. | 474/28 |
| 5,514,047 | A * | 5/1996 | Tibbles et al. | 477/46 |
| 5,569,113 | A * | 10/1996 | Harrison | 476/58 |
| 5,669,846 | A * | 9/1997 | Moroto et al. | 475/211 |
| 5,690,576 | A * | 11/1997 | Moroto et al. | 475/211 |
| 5,788,600 | A * | 8/1998 | Tsukamoto et al. | 477/45 |
| 5,813,933 | A * | 9/1998 | Tsukamoto et al. | 474/11 |
| 5,846,152 | A * | 12/1998 | Taniguchi et al. | 475/210 |
| 5,961,418 | A * | 10/1999 | Taniguchi et al. | 477/47 |
| 6,146,308 | A * | 11/2000 | Taniguchi et al. | 477/48 |
| 6,181,020 | B1 * | 1/2001 | Uchida et al. | 290/40 C |
| 6,409,625 | B1 * | 6/2002 | Sakai et al. | 475/208 |
| 6,419,608 | B1 | 7/2002 | Miller | |
| 6,520,878 | B1 * | 2/2003 | Leclair et al. | 474/14 |
| 6,909,953 | B2 | 6/2005 | Joe et al. | |
| 7,011,600 | B2 | 3/2006 | Miller et al. | |

(Continued)

FOREIGN PATENT DOCUMENTS

JP   2006015025 A * 1/2006

*Primary Examiner*—Lesley Morris
*Assistant Examiner*—Jacob Meyer
(74) *Attorney, Agent, or Firm*—Knobbe Martens Olson & Bear LLP (57) ABSTRACT

A system for providing an automated axial force to a continuously variable transmission (CVT) in a wheelchair. An electronic transmission control receives one or more input signals generated by throttle position or other variables. The microprocessor generates an output signal that adjusts the axial force applied to a CVT thereby automatically adjusting the input to output ratio. The invention also provides a manually-controlled variator is designed for use on a wheelchair. The manual shifter hydraulically adjusts an axial force imparted on a variator in communication with a wheelchair wheel and a hand rim. Application of the axial force causes the hand rim input and wheelchair wheel output ratio to change, permitting a wheelchair operator to manually adjust the input to output ratio to more easily operate the wheelchair.

2 Claims, 9 Drawing Sheets

U.S. PATENT DOCUMENTS 7,011,602 B2 3/2006 Makiyama et al.
2004/0087412 A1* 5/2004 Mori et al. .................... 476/46
2005/0215393 A1 9/2005 Shimoda
2007/0219696 A1* 9/2007 Miller et al. .................. 701/51

* cited by examiner

WHEEL CHAIR

CROSS-REFERENCE TO RELATED APPLICATIONS

This application claims the benefit of and priority to U.S. Provisional Patent Application No. 60/782,046 filed Mar. 14, 2006 the technical disclosures of which are hereby incorporated herein by reference.

TECHNICAL FIELD OF INVENTION

The present invention relates generally to a continuously variable transmission (CVT) and specifically to an improved wheelchair that incorporates a CVT.

BACKGROUND OF THE INVENTION

A transmission is any mechanical linkage that converts an input torque to an output torque. It usually involves a series of gears that have differing diameters, allowing a first gear at a first rotation rate to link to a second gear rotating at a second rate. The most common application for transmissions is in a vehicle. For example, a car may have an automatic transmission or a manual transmission. A bicycle has a simple transmission that links the pedals to the hub of the rear wheel.

Transmissions allow an input force to be converted into a more useful and appropriate output. However, by using gears and linkages, a typical transmission may only have four or five ratios available. For example, a four speed automatic transmission in a car has only four sets of output gears to couple to the engine's input. A ten speed bike has only ten ratios of input to output. A need exists for a transmission that is not limited by the number of gears. Yet, to place a larger number of gears into a transmission increases its costs and weight and space requirements.

A continuously variable transmission (CVT) or continuously variable planetary (CVP) is a transmission that eliminates the need for a specified number of gears. Instead it allows an almost limitless number of input to output ratios. This is a benefit because it allows an output to be achieved, i.e. the speed of a vehicle, at an optimal input, i.e. the rpm of the engine. For example, an engine might be most efficient at 1800 rpm. In other words, the peak torque output for the engine might be achieved at this engine rpm, or perhaps the highest fuel economy. Consequently, it may be desirable to run at a specified RPM for an economy mode or a power mode. Yet, in third gear, the car might be going faster at 1800 rpm than the driver desires. A continuously variable transmission would allow an intermediate ratio to be achieved that allowed the optimal input to achieve the desired output.

CVTs have a variator for continuously variable adjustment of the ratio. A customary structure is a belt drive variator having two pairs of beveled pulleys and rotating a torque-transmitter element therein, such as a pushing linked band or a chain. The beveled pulleys are loaded with pressure from the transmission oil pump in order, on one hand, to actuate the ratio adjustment and, on the other, to ensure a contact pressure needed for transmission of the torque upon the belt drive element. Another usual structure is a swash plate variator in semi-toroidal or fully toroidal design.

Examples of CVTs are exemplified by U.S. Pat. Nos. 6,419,608 and 7,011,600 assigned to Fallbrook Technologies of San Diego, Calif. In each of those references the axial movement of a rod or an axial force as indicated by numeral 11 of each reference is used to vary the input to output ratio of such transmissions. While a continuously variable transmission is artful on paper, the realities of making one work smoothly requires significant know how. Consequently, a need exists for a system that permits axial shifting of the rod 11.

While CVTs have primarily been applied to more conventional vehicles such as motor scooters and bicycles, wheelchairs represent another class of transport that has been inadequately equipped over the years.

SUMMARY OF THE INVENTION

In one aspect, the present invention is directed towards a system for providing an automated axial force to a CVT. In one embodiment, the system comprises an electronic transmission control for a CVT that is adjusted by an axial force provided by a motor. The electronic transmission controls comprises a sensor for receiving an input signal that is dependent upon one or more automatically-generated variables such as throttle position, the current draw from the battery, the variator setting, the level of charge in the battery or battery level, the control settings of the motor controller (e.g., linear or s-curve), the wind direction, the wind speed, and the tire pressure. A microprocessor processes the input signals and transmits an output signal to a motor that adjusts an axial force that is applied to a variator. The axial force can be applied by a translational force, or a threaded screw. In another embodiment, the transmission ratio is set using a push button control.

The present invention also provides an improved wheelchair having a manually controlled CVT. In one embodiment, the manual control comprises a piston bounded by a first fluid reservoir and second fluid reservoir coupled to a hydraulically actuated piston having a pushing fluid reservoir and a pulling fluid reservoir. Application of downward force to the piston causes fluid to exit from the second fluid reservoir and causes fluid to enter the pulling fluid reservoir. Simultaneously, fluid is pulled into the first fluid reservoir and out of the pushing fluid reservoir. Consequently, the hydraulically actuated piston moves in a first axial direction away from the manually-controlled variator.

Alternatively, application of upward force to the piston causes fluid to exit from the first fluid reservoir and causes fluid to enter the pushing fluid reservoir. Simultaneously, fluid is pulled into the second fluid reservoir and out of the pulling fluid reservoir. Consequently, the hydraulically actuated piston moves in a second axial direction towards the transmission.

The invention permits a user to adjust the input to output ratio based upon conditions including the slope of the navigational path or the speed of a wheelchair. Hence, this invention provides a manually-controlled variator for a wheelchair that a person can use to easily adjust the input to output ratio. Consequently, the instant invention provides an easy way to use a continuously variable transmission or manually-controlled variator on a wheelchair.

In one aspect, the present invention permits one to manually adjust the input to output ratio applied to two or more wheels and thereby steer the vehicle.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
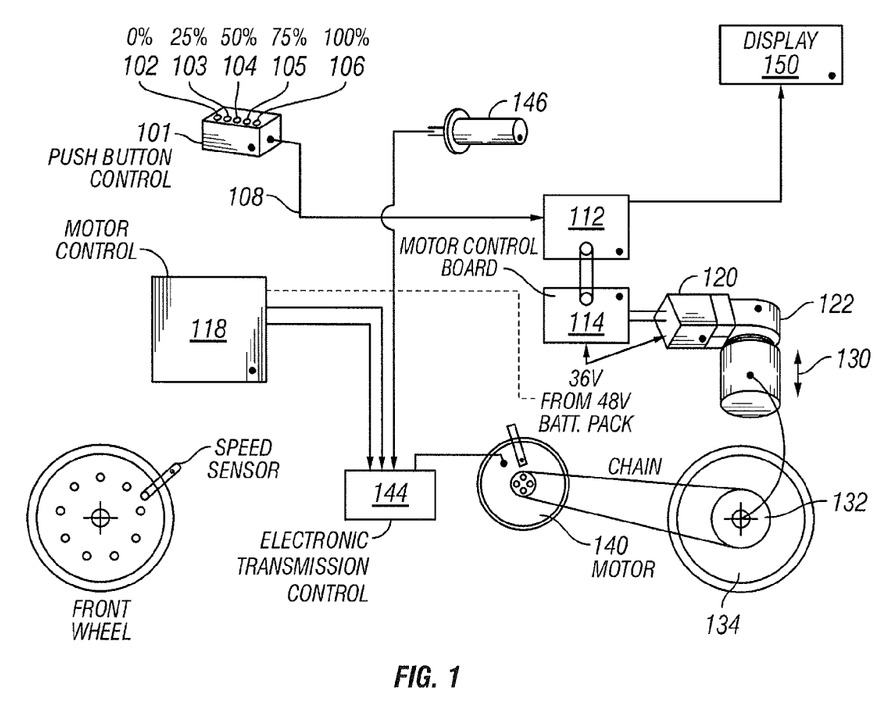
FIG. 1 is a schematic representation depicting the operation of manually controlled variator in a light electric vehicle.

FIG. 1 is a schematic representation depicting the operation of manually controlled CVT or variator in a light electric vehicle, such as an motorized wheelchair. As shown in FIG. 1, a manual push button control box 101 has buttons corresponding to a signal output 108 of 0% 102, 25% 103, 50% 104, 75% 105, and 100% 106 sent to a microprocessor 112. The microprocessor output can be shown on a display 150. The microprocessor 112 interfaces with a motor control board 114 which receives power from a battery pack 118.

A servo motor 120 engages a 90° gearbox 122 which provides an axial force 130 to a variator (CVT) 132 in contact with the rear wheel 134. As used herein, the term "variator" is synonymous with a continuously variable transmission or an infinitely variable transmission, or a continuously variable planetary, terms known to those skilled in the art. For example, CVTs can include devices where power transfer occurs through an endless torque-transmitting means that circulates between two pairs of conical disks whereby the effective radius of each conical disk pair is variable by changing the spacing between the disks. Other steplessly adjustable transmissions can be based upon rolling elements that run frictionally engaged between suitable toroidal surfaces.

The rear wheel 134 is powered by a chain 136 or other equivalent means connected to a drive motor 140 (e.g., Briggs & Stratton ETEK). The motor 140 speed is regulated by a current sent by a motor control device 144. The motor control device 144 is regulated by a throttle 146 and is powered by a battery 118.

While a user of the electric vehicle can manually shift gears via the push button control box 101, it is also desirable to have an automatic shifting transmission to permit an electric wheelchair to operate in a power mode or an economy mode.

Figure 2:
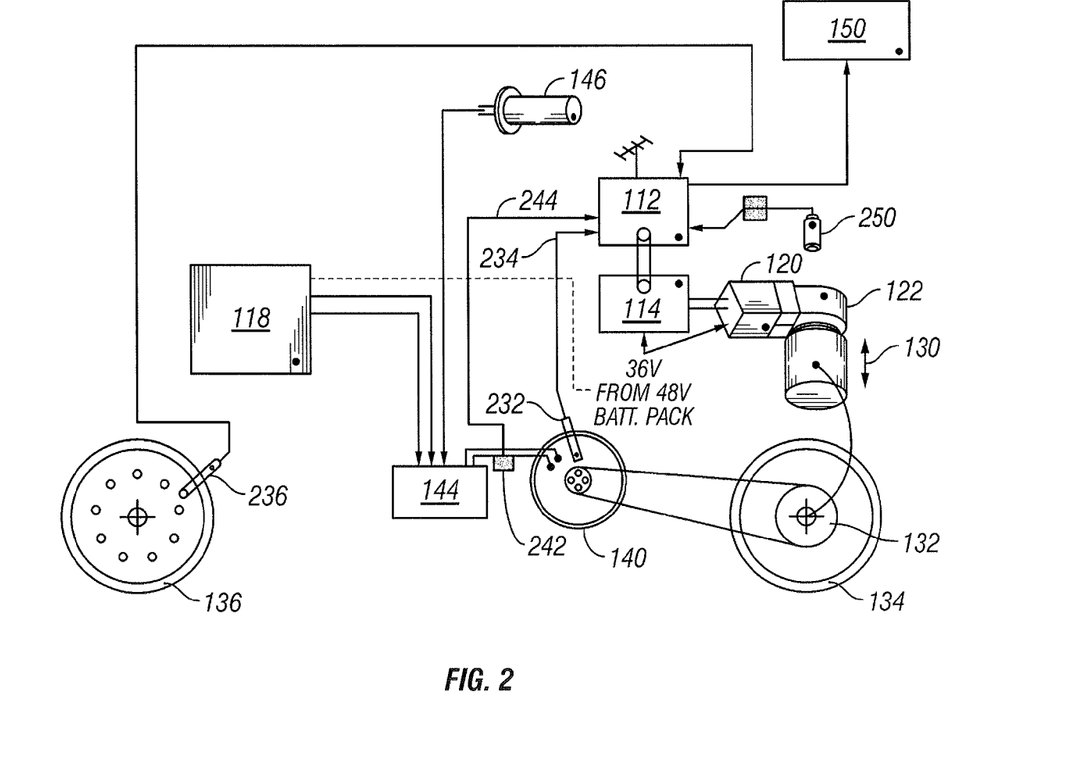
FIG. 2 is a schematic representation depicting various potential embodiments of the present invention in a light electric vehicle.
Figure 3A:
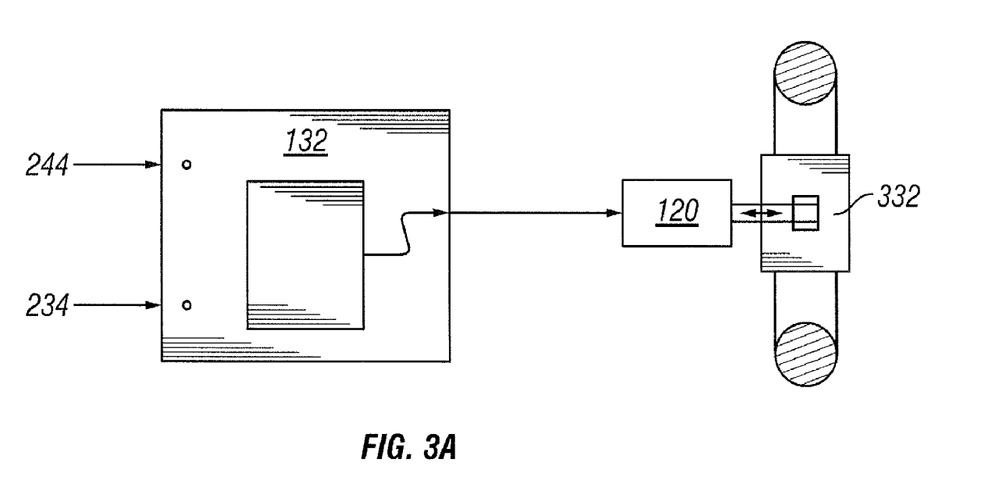
FIG. 3A is a schematic representation of the automatic operation theory in accordance with one embodiment of the present invention.

FIG. 2 is a schematic representation depicting various potential embodiments of the present invention in a light electric vehicle. FIG. 3A is a simplified schematic representation of the automatic operation theory in accordance with one embodiment of the present invention. Rather than using a push button control box 101 to manually control the transmission ratio as shown in FIG. 1, one or more automatically-generated variables are used to automatically adjust the CVT. For example, referring to FIG. 2 and FIG. 3A, the amount of current being drawn from the motor control device 144 as measured by a current sensor 242 comprises an automatically generated variable that can be used as an input signal 244 to the microprocessor 112.

Motor controllers such as those available from Altrax of Grants Pass, OR can be used. In one embodiment, the microprocessor 112 comprises a basic stamp board available from Parallax, Inc. of Rocklin, Calif. The microprocessor 112 can be programmed to generate a lookup table to provide optimum set points for variable inputs to obtain either the best performance or optimal efficiency of the wheelchair.

Referring to FIG. 2 and FIG. 3A, the wheelchair speed is automatically generated by a sensor 236 mounted on the front wheel 136. In one embodiment, the sensor 236 comprises a plurality of magnets mounted around the front wheel rim and a hall effect sensor mounted via a bracket and wired to the microprocessor 112. The hall effect sensor 236 transmits a pulse of input signal to the microprocessor 112 each time a magnet passes the hall effect sensor 236. Based on the frequency of pulses or input signals the microprocessor 112 can calculate a speed and an output signal to adjust the axial force provided to the CVT.

Similarly, motor speed may also be calculated by placing another hall effect sensor 232 on the motor 140 which provides an input signal 234 to the microprocessor 112 each time a magnet passes the hall effect sensor 232.

The speed is just one example of an automatically generated variable. Other examples of automatically generated variables include, but are not limited to the throttle position, the current draw from the battery, the variator setting, the level of charge in the battery or battery level, the control settings of the motor control device (e.g., linear or s-curve), and tire pressure.

In the example depicted in FIG. 3A, the microprocessor 112 receives data from the front wheel speed sensor 236 and current draw sensor 244. The microprocessor 112 then outputs a signal to the servo 120, which in turn provides an axial force to the variator 332 to shift in an optimal manner that minimizes current draw 244 or power drain so as to provide optimal efficiency.

Figure 3B:
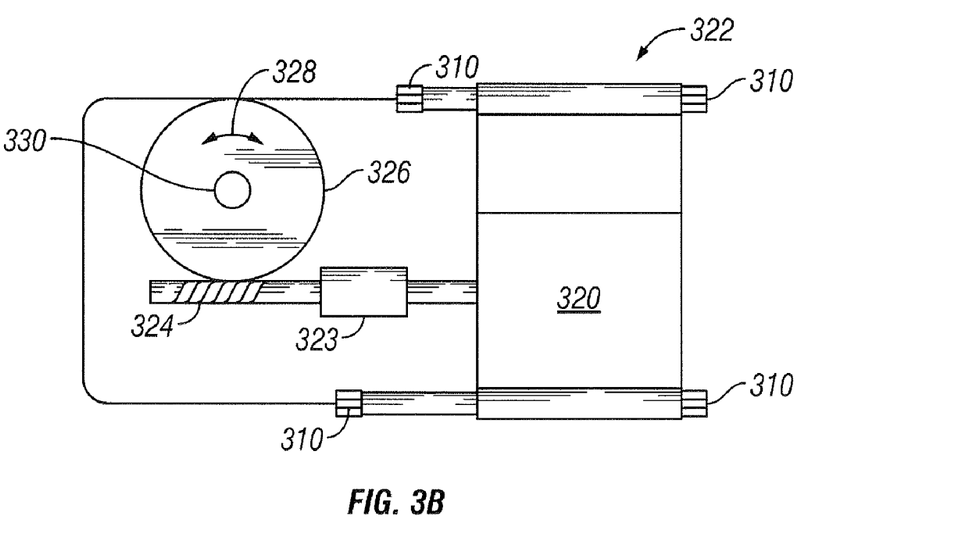
FIG. 3B is a schematic representation of the 90° gearbox in accordance with one embodiment of the present invention.

FIG. 3B is a schematic representation of the 90° gearbox in accordance with one embodiment of the present invention. The gearbox 322 comprises a servo 320 mounted with bolts 310 to the wheelchair frame (not shown). A coupler 323 is disposed between a threaded (worm) shaft 324 and the servo 320. Upon rotation of the threaded shaft 324, the wheel 326 rotates as depicted by numeral 328, causing the shift shaft 330 to rotate. Such rotation of the shift shaft 330 is converted into an axial force.

The 90° gearbox setup is used to provide a mechanical advantage (i.e. 36:1) and to reduce the size of the protrusion from the side of the wheelchair.

When the system is turned on the servo motor 320 is driven towards home until the shift shaft 330 contacts the home sensor 250 (shown in FIG. 2). The servo is stopped and the microprocessor 112 sets the internal electronic home position, registering voltage, turns, and rotation direction. In response to button push, based on the last known servo position a comparison is made between the current position and the "button called" position. The microprocessor 112 then drives the servo 320 to the "called" position.

Figure 4A:
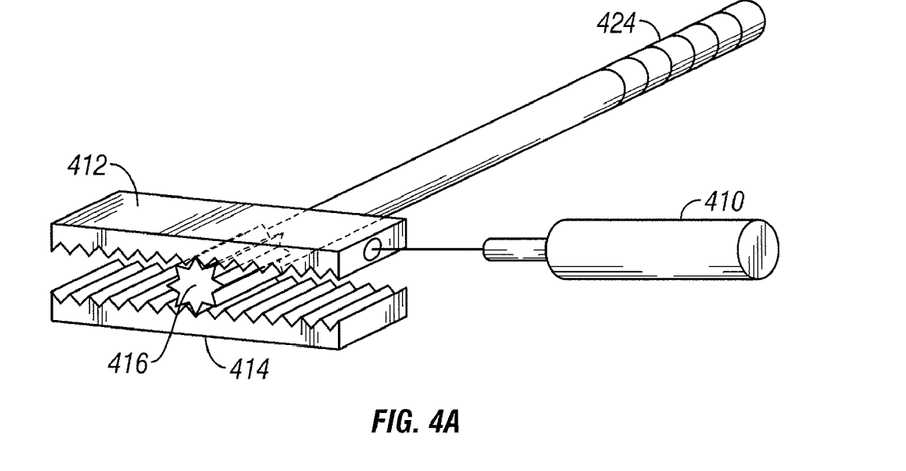
FIG. 4A is a schematic representation of a linear actuator in accordance with an alternative embodiment of the present invention.

FIG. 4A is a simplified schematic representation of a linear actuator in accordance with an alternative embodiment of the present invention. This embodiment uses a rack and pinion setup and can be mounted close inside the frame of the wheelchair. The end 416 of the threaded shaft 424 is adapted to couple between a first tooth-like member 412 and a second tooth-like member 414. As the servo motor rotates the shaft end 416, the first tooth-like member 412 is driven axially and thereby provides an axial force to a member 410 that is in communication with the tooth-like member 412 and a variator (not shown).

Figure 4B:
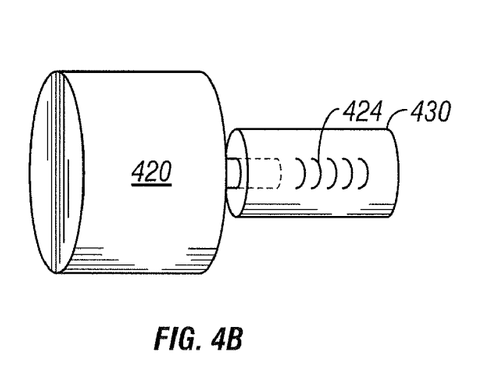
FIG. 4B is a schematic representation of a servo motor mounted on a rear wheel in accordance with an alternate embodiment of the present invention.

FIG. 4B is a schematic representation of a servo motor mounted on a rear wheel in accordance with an alternate embodiment of the present invention. The servo motor 420 is connected to a shaft 430 having a threaded portion 424 adapted to couple with a threaded variator shaft (not shown). The internal threaded portion 424 allows space for the variator shaft to be pulled in and out. The servo motor 420 turns the shaft 430 thereby causing the threaded portion 424 to move the variator shaft in or out, thus adjusting the variator.

Figure 4C:
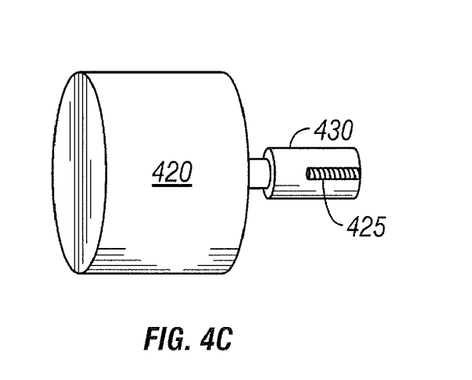
FIG. 4C is a schematic representation of an alternate servo motor design in accordance with another embodiment of the present invention.

FIG. 4C is a schematic representation of an alternate servo motor design in accordance with another embodiment of the present invention. Like the embodiment depicted in FIG. 4B, the servo motor 420 in this embodiment is also mounted at the rear wheel of the wheelchair. However, in this embodiment, the servo motor 420 is connected to a shaft 430 having a splined portion 425 adapted to couple with a variator shaft (not shown). The servo motor 420 turns the splined shaft 430, thereby creating an axial force on the variator shaft, thus adjusting the variator.

Figure 4D:
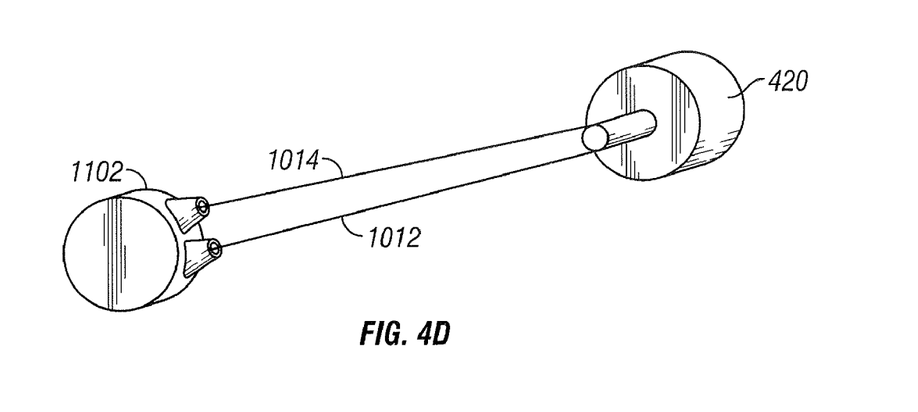
FIG. 4D is a simplified schematic representation of a servo motor mounted remote from the rear wheel in accordance with an alternative embodiment of the present invention.

FIG. 4D is a schematic representation of the servo motor in communication with a hub that contains the variator in accordance with another alternate embodiment of the present invention. In this embodiment, a hub 1102 containing the variator is mounted at the rear wheel of the wheelchair (not shown), and the servo motor is mounted up on the wheelchair frame. The rear hub 1102 includes a housing having an axial force that encloses and protects a pulley system coupled to cables 1012 and 1014. These cables 1012, 1014 in turn are connected to the servo motor 420, which alternately pulls cable 1012 or cable 1014 in order to adjust the variator inside the hub 1102.

While the above description covers examples of how an electronic transmission control can automatically adjust the axial force provided to a variator, the axial force can also be adjusted manually in a motorized or non-motorized vehicle. For example, in accordance with one embodiment of the present invention, a wheelchair is equipped with a manually activated wheel piston assembly that allows a person with a level of disability to exert a constant force to an input and achieve an optimum output to the drive wheels.

Figure 5:
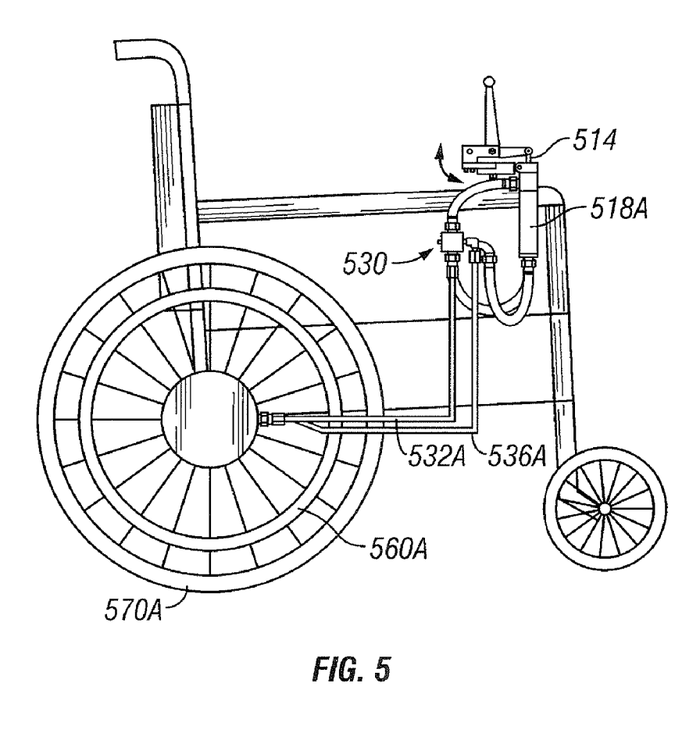
FIG. 5 is a side view illustration of a manually controlled variator mounted on a wheelchair in accordance with one embodiment of the present invention.
Figure 6:
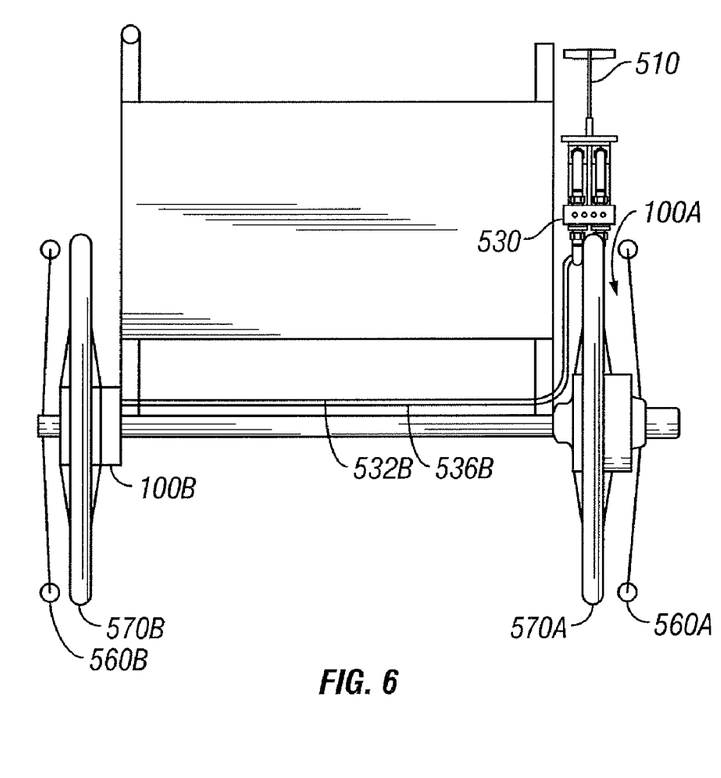
FIG. 6 is a rear view illustration of the manually-controlled variator and wheelchair depicted in FIG. 5.
Figure 7:
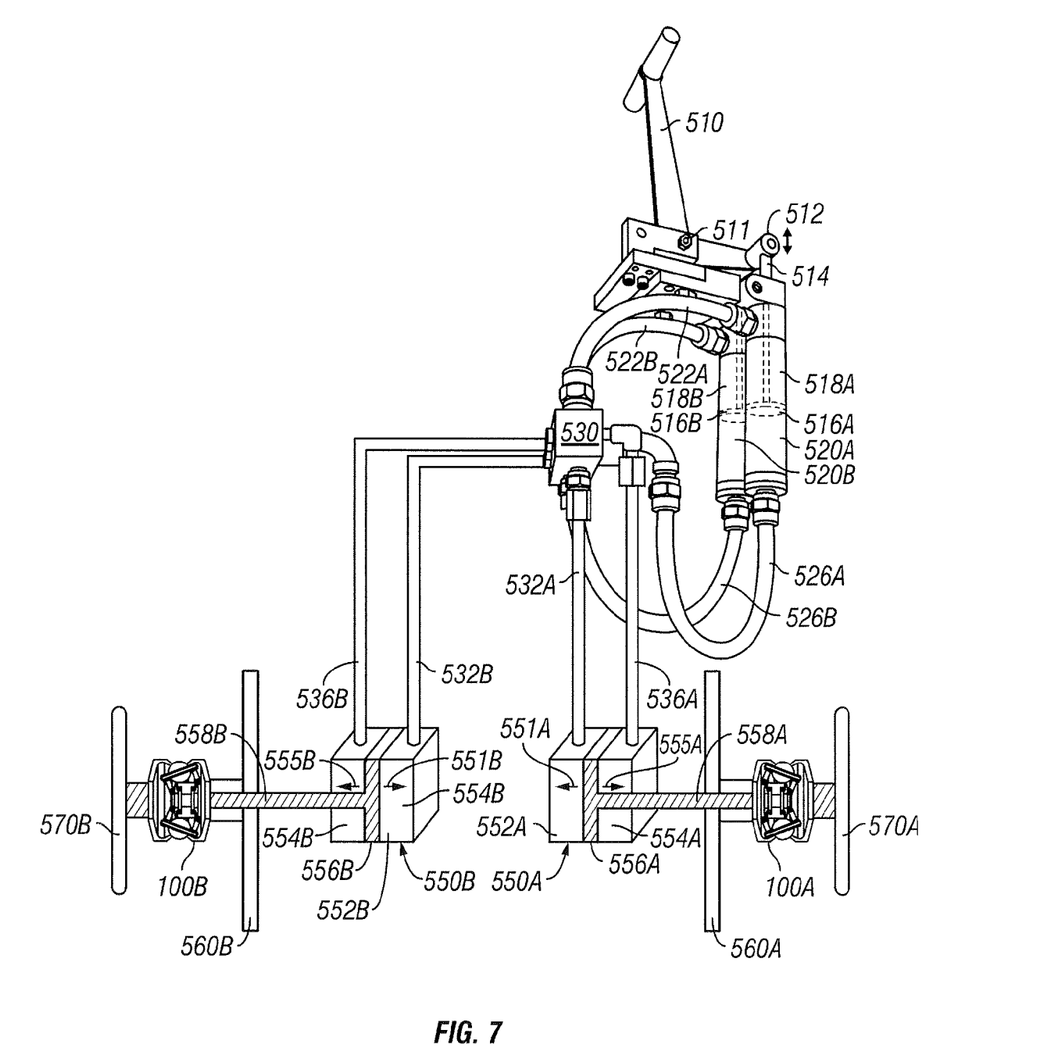
FIG. 7 is a perspective view illustration of the manually-controlled variator and wheelchair depicted in FIG. 5.

FIG. 5 is a side view illustration of a manually-controlled variator mounted on a wheelchair in accordance with one embodiment of the present invention. FIG. 6 is a rear view illustration of the manually-controlled variator and wheelchair depicted in FIG. 5. FIG. 7 is a perspective view illustration of the manually-controlled variator and wheelchair depicted in FIG. 5.

Referring to FIGS. 5, 6, and 7, in one embodiment the manually-controlled variator comprises a lever 510 having one end pivotally 511 attached 512 to an arm 514 in communication with two pistons 516a 516b. Each piston 516a 516b is bound by a first fluid reservoir 518a 518b and second fluid reservoir 520a 520b. The first fluid reservoir 518a 518b is in hydraulic communication with a wheel piston assembly 550a 550b in axial communication with a CVT 100a 100b.

Pushing forward on the lever 510 forces the arm 514 downward and forces each piston 516a 516b downward. As a result, positive hydraulic pressure is applied to the fluid in the reservoir 520a 520b forcing fluid through the flexible hoses 526a 526b into a coupler 530 and through hard piping 532a 532b into a reservoir 552a 552b. The coupler 530 merely provides a means for switching from a flexible hose 522a 522b 526a 526b into a rigid line 532a 532b 536a 536b. This embodiment can be advantageous as it can keep flexible hoses 522a 522b 526a 526b from interfering with or becoming tangled with a user's hands, the wheelchair wheel 570a 570b and/or the hand rim 560a 560b during rotation.

When positive hydraulic pressure is applied to the pushing reservoir 552a 552b, the piston 556a 556b forces the arm 558a 558b attached to the piston to move in the direction towards the CVT 100a 100b as indicated by arrow 555a 555b. Similarly, when positive hydraulic pressure is applied to the pulling reservoir 554a 554b, the piston 556a 556b forces the arm 558a 558b attached to the piston to move in the direction away from the CVT 100a 100b as indicated by arrow 551a 551b.

One advantage of the embodiment described above is the efficient design of the hydraulic system. For example, when the lever 510 is pushed forward the arm causes the piston 516a 516b to push fluid out of the second fluid reservoir 520a 520b to the pulling reservoir 554a 554b and simultaneously pull fluid into the first fluid reservoir 518a 518b from the pulling reservoir 552a 552b. Consequently, both the first fluid reservoir and second fluid reservoir are in hydraulic communication with the arm 558a 558b via the piston 556a 556b. It should be noted that the above example is provided merely for purposes of illustration. For example, in one embodiment, the second fluid reservoir 520a 520b is not in communication with the second piston 556a 556b.

Figure 8:
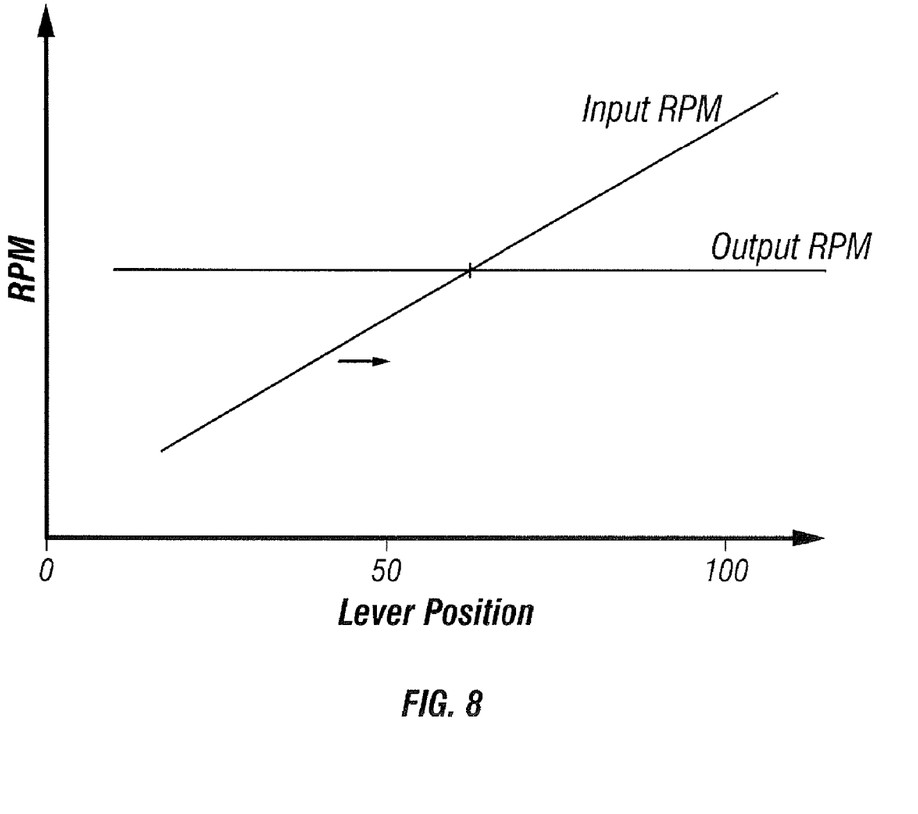
FIG. 8 is a schematic representation of the input rpm and resultant output rpm based upon the lever position in accordance with one embodiment of the present invention.

FIG. 8 is a schematic representation of the Input RPM and resultant Output RPM based upon the variator position in accordance with one embodiment of the present invention. Referring to FIGS. 5 and 8 the position of the lever 510 can move from a position closest to the user ("0" position) to a position furthest from the user ("100" position). The present invention permits an operator to easily change the input to output ratio by merely moving the lever 510.

As used herein, an input to output ratio is defined as the number of hand rim 560a 560b revolutions divided by the number of corresponding wheelchair wheel 570a 570b revolutions. For example, referring to FIG. 8, when the lever is in a position close to zero, one RPM input to the hand rim 560a 560b results in a greater RPM output by the wheelchair drive wheels 570a 570b. This is similar to "high gear" in a geared transmission and permits an operator better control to slow downhill movement or rapid level surface movement.

At the intersection of the Input RPM and Output RPM lines, one RPM input to the hand rim equals one RPM at the wheelchair drive wheels 570a 570b. Such configuration may be desirable for level surface operation. In one embodiment, the input to output ratio for level surface operations comprises between about 1.0 and about 1.8.

When the lever position is in a position close to 100, an input of one RPM to the hand rims 560a 560b will equal less than one RPM of input to the wheelchair drive wheels 570a 570b. Such configuration is similar to low gear in a geared transmission and permits an operator to more easily climb inclined surfaces. In one embodiment, the input to output ratio for climbing an inclined surface comprises between about 0.5 and about 1.0.

Figure 9:
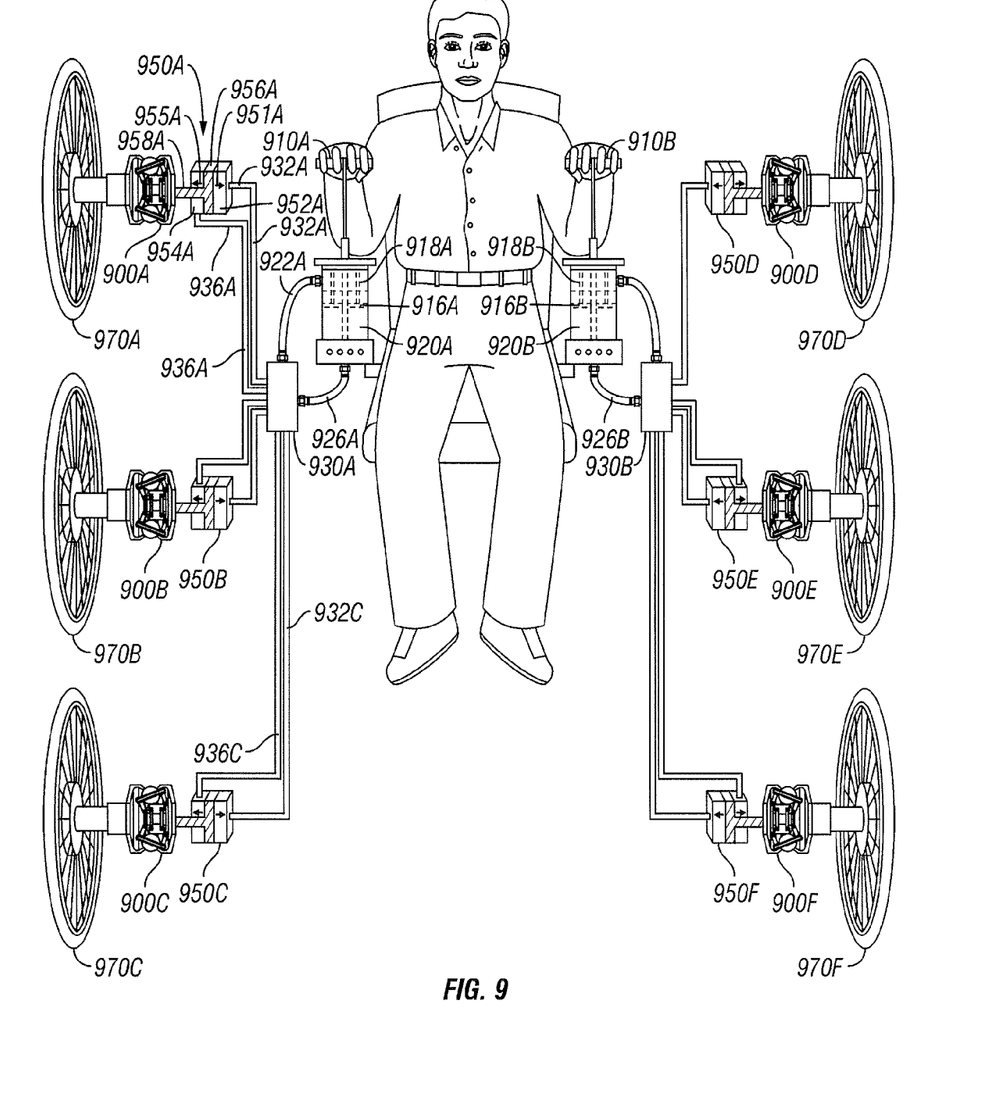
FIG. 9 is a simplified schematic representation depicting a configuration that permits manual steering of a vehicle having two sets of three variators with each set in series in accordance with one embodiment of the present invention.

FIG. 9 is a simplified schematic representation depicting a configuration that permits manual steering of a vehicle having two sets of three variators with each set in series in accordance with one embodiment of the present invention. As shown in FIG. 9, each variator 900a 900b 900c 900d 900e 900f has a corresponding wheel piston assembly 950a 950b 950c 950d 950e 950f. The wheel piston assemblies are similar in operation to the assembly depicted in FIG. 7.

In this embodiment, steering is achieved by changing the input to output ratio to a first set of variators 900a 900b 900c in communication with drive wheels 970a 970b 970c on a first side of a vehicle relative to a second set of variators 900d 900e 900f in communication with wheels 970d 970e 970f on a second side of a vehicle. For example, pushing forward on the first lever 910a forces the piston 916a downward. As a result, positive hydraulic pressure is applied to the fluid in the reservoir 920a forcing fluid through the flexible hose 926a into a coupler 930a and through hard piping 932a into a reservoir 952a. When positive hydraulic pressure is applied to the pushing reservoir 952a, the piston 956a forces the arm 958a attached to the piston to move in the direction towards the variator 100 as indicated by arrow 955a.

Similarly, by pulling back on the first lever 910a positive hydraulic pressure is applied to the first fluid reservoir 918a through the flexible hose 922a and through the hard piping 936a to the pulling reservoir 954a. Consequently, the piston 956a forces the arm 958a attached to the piston to move in the direction away from the CVT 900a as indicated by arrow 951a.

In one embodiment, one or more of the variators 900a 900b 900c 900d 900e 900f comprise an infinitely variable transmission (IVT). Consequently, adjusting the axial direction applied to the first set of variators 900a 900b 900c can turn the first set of wheels 970a 970b 970c in a direction different from the second set of wheels 970d 970e 970f. As a result, the vehicle can have a little or no turning radius. Further, such embodiment can be used to manually put the vehicle in reverse.

As previously discussed, a variator is designed to vary an input to output ratio in the same way as gears change the input to output ratio on a car or bicycle. The input to output ratio is changed based upon the axial movement of a rod connected to the variator. The axial movement can be provided by a manual hydraulic system as exemplified by FIG. 7, by a manual electric system as exemplified by FIG. 1, or by a manual mechanical system as described by co-pending application U.S. Ser. No. 11/409,846. Furthermore, the axial movement, and hence input-to-output ratio, can also be adjusted automatically based upon an automatically generated input signal. The axial adjustment can occur through hydraulic, electrical, or mechanical means.

The present invention also contemplates the combination of the various ways of changing the input to output ratio. One example of the way in which the variators can be combined is depicted in FIG. 10, which is a partial simplified schematic representation depicting two variators in series in accordance with one embodiment of the present invention.

Figure 10:
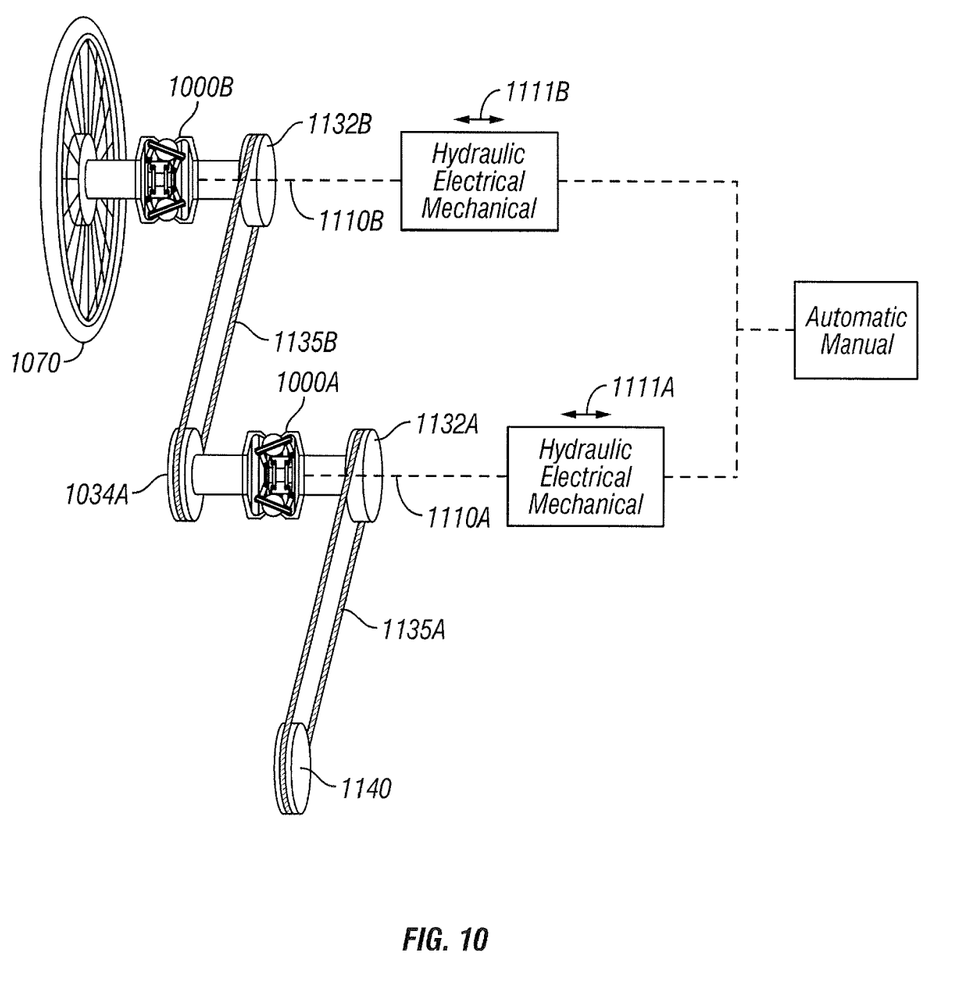
FIG. 10 is a partial simplified schematic representation depicting two variators in series in accordance with one embodiment of the present invention.

As shown in FIG. 10, an input RPM is provided by a rotating member 1140 attached to a motor (not shown). The rotating member 1140 can creates rotation in input shaft 1132a connected to a first variator 1000a by a chain, cable 1135a or other endless torque-transmitting means. The first variator output shaft is connected to a rotating member 1034a connected to a second variator 1000b input shaft 1132b.

The first variator input-to-output ratio can be adjusted by axial movement of a rod 1110a that can be adjusted by hydraulic, electrical, or mechanical device. The second variator 1000b output shaft is connected to a wheel 1070. Consequently, a wider range of input-to-output ratios can be achieved by having two or more variators in series. For example, if the first variator is capable of achieving an input to output ratio of 1:10 and the second variator is capable of achieving an input to output ratio of 1:10, an overall input to output ratio of 1:100 can be achieved. Furthermore, a wider range of control can be achieved. For example, in one embodiment, a second device for adjusting a second axial force 1111b to a second continuously variable transmission or variator 1000b is based upon an automatically generated output signal such as vehicle speed. Such embodiment can be beneficial to provide an overdrive or ultra-low gear for climbing a hill.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. A wheelchair, comprising:
   (a) at least two continuously variable transmissions (CVTs) arranged in series and mounted to each of the rear drive wheels, wherein the CVTs adjust the RPM ratio between the drive wheels and hand rims mounted on the drive wheels;
   (b) at least one manual lever for adjusting the transmission ratio of the CVTs;
   (c) at least one hydraulic system that provides communication between said manual lever and the CVTs.

2. The wheelchair according to claim 1, wherein the hydraulic system further comprises:
   (i) a first piston bounded by a first fluid reservoir and second fluid reservoir;
   (ii) a hydraulically actuated second piston having a pushing fluid reservoir and a pulling fluid reservoir;
   wherein application of downward force to the first piston via the manual lever causes fluid to exit from the second fluid reservoir and enter the pulling fluid reservoir, while simultaneously, fluid is pulled into the first fluid reservoir and out of the pushing fluid reservoir, causing the hydraulically actuated second piston to move in a first axial direction away from the CVT; and
   wherein application of upward force to the piston via the manual lever causes fluid to exit from the first fluid reservoir and enter the pushing fluid reservoir, while simultaneously, fluid is pulled into the second fluid reservoir and out of the pulling fluid reservoir, causing the hydraulically actuated second piston to move in a second axial direction towards the CVT.

* * * * *